(12) United States Patent
Gronkowski

(10) Patent No.: US 9,814,219 B2
(45) Date of Patent: Nov. 14, 2017

(54) AQUARIUM DIVIDER

(71) Applicant: Christopher M Gronkowski, Colleyville, TX (US)

(72) Inventor: Christopher M Gronkowski, Colleyville, TX (US)

(*) Notice: Subject to any disclaimer, the term of this patent is extended or adjusted under 35 U.S.C. 154(b) by 295 days.

(21) Appl. No.: 14/566,373

(22) Filed: Dec. 10, 2014

(65) Prior Publication Data

US 2015/0250149 A1   Sep. 10, 2015

Related U.S. Application Data

(60) Provisional application No. 61/948,422, filed on Mar. 5, 2014.

(51) Int. Cl.
*A01K 63/00* (2017.01)

(52) U.S. Cl.
CPC ....... *A01K 63/006* (2013.01); *Y10T 29/49826* (2015.01)

(58) Field of Classification Search
CPC ...... A01K 63/006; B65D 25/04; B65D 25/06; B65D 25/08; E06B 2009/527; E06B 2009/524; E06B 9/52
See application file for complete search history.

(56) References Cited

U.S. PATENT DOCUMENTS

| 2,232,303 | A | * | 2/1941 | Bailey | B60J 3/02 160/369 |
| RE25,190 | E | * | 6/1962 | Stwertka | E06L 39/52 160/352 |
| 3,288,110 | A | | 11/1966 | Goldman et al. | |
| 3,308,875 | A | * | 3/1967 | Abrams | A47H 23/04 160/237 |
| 3,512,503 | A | * | 5/1970 | Willinger | A01K 63/003 119/251 |
| 3,682,138 | A | * | 8/1972 | Day | A01K 61/59 119/205 |
| 4,029,050 | A | | 6/1977 | Genest | A01K 63/006 119/201 |
| 4,120,265 | A | | 10/1978 | Davis | |
| 5,010,845 | A | * | 4/1991 | Azpurua | A01K 63/006 119/452 |
| 5,090,357 | A | * | 2/1992 | Pucci | A01K 63/006 119/256 |
| 5,144,908 | A | * | 9/1992 | Tominaga | A01K 61/17 119/248 |

(Continued)

FOREIGN PATENT DOCUMENTS

GB   2268383 A * 1/1994 ........... A01K 63/006

*Primary Examiner* — Kathleen I Alker
(74) *Attorney, Agent, or Firm* — Roberts Foster LLP

(57) ABSTRACT

An apparatus for dividing an aquarium into a plurality of compartments includes retainer assemblies and a divider. The retainer assemblies each have a retainer member and a base member, and the base member is removably attachable to the aquarium. The divider is positionable between retainer assemblies and has at least one opening allowing for fluid communication between compartments. A method for dividing an aquarium into compartments includes affixing retainer assemblies to locations in the aquarium, positioning a divider between the retainer assemblies, and connecting the divider to the retainer assemblies.

8 Claims, 5 Drawing Sheets

(56) References Cited

U.S. PATENT DOCUMENTS

| | | | | |
|---|---|---|---|---|
| 5,144,909 | A | * | 9/1992 | Tominaga ............ A01K 63/006 119/248 |
| 5,404,839 | A | * | 4/1995 | Mancuso ............. A01K 63/003 119/246 |
| 5,564,770 | A | * | 10/1996 | Smith ..................... B60J 11/08 150/168 |
| 6,443,099 | B1 | * | 9/2002 | Boggs ................. A01K 63/006 119/248 |
| 6,474,265 | B1 | | 11/2002 | Powell |
| 2011/0107977 | A1 | * | 5/2011 | Smalls ................ A01K 63/006 119/216 |

* cited by examiner

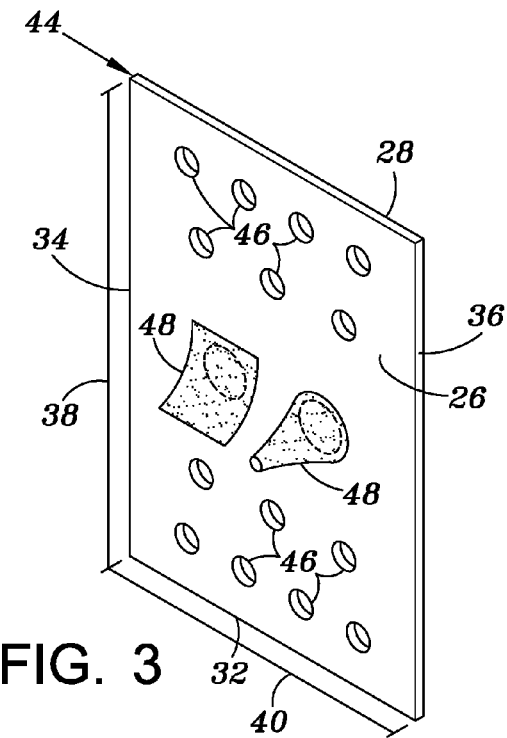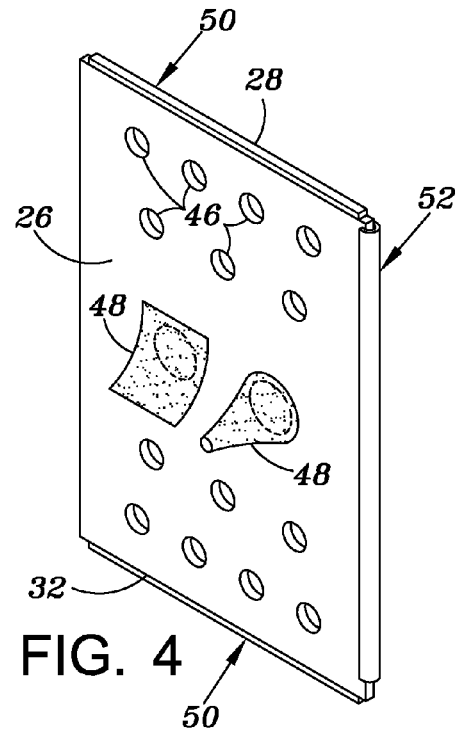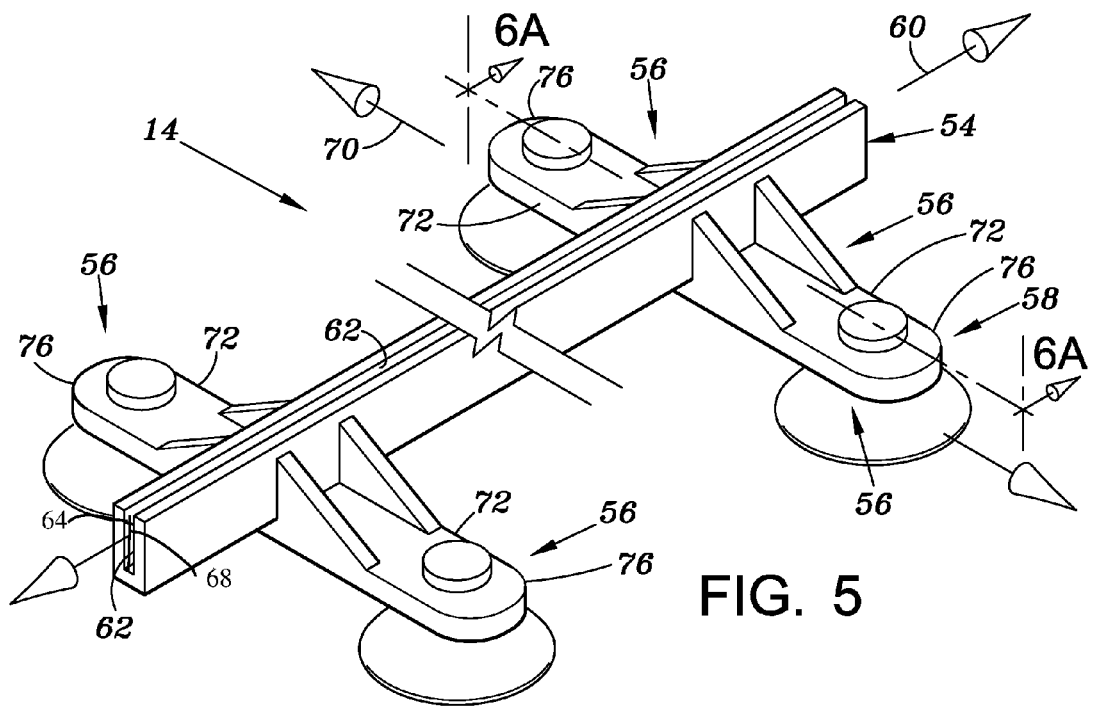

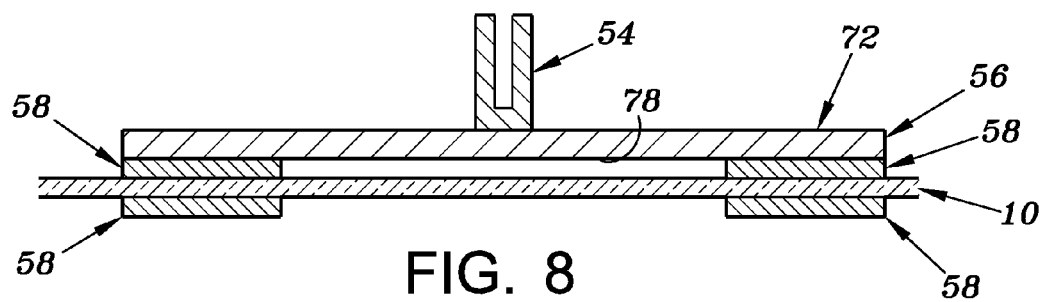
FIG. 8
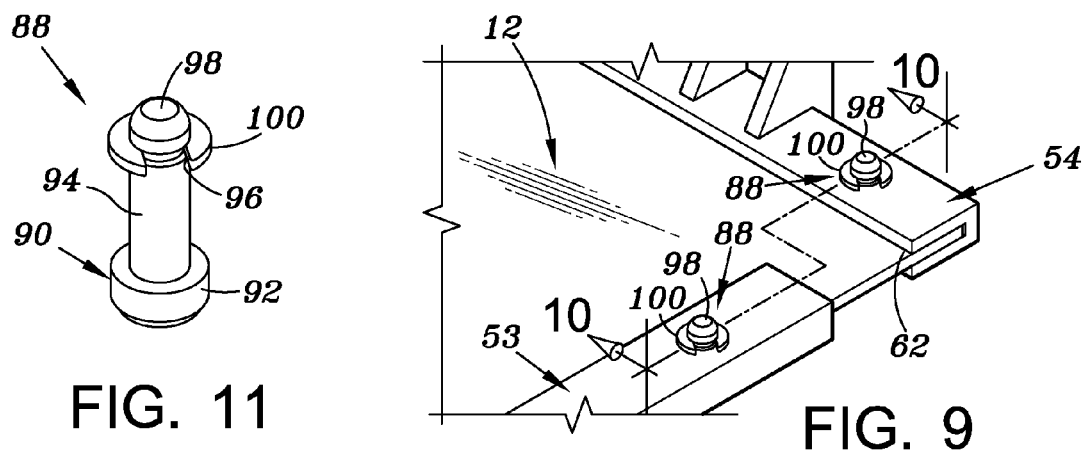
FIG. 11
FIG. 9
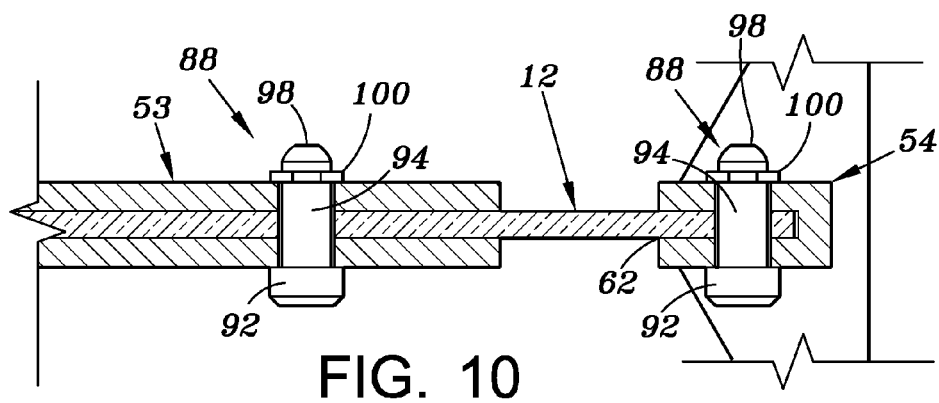
FIG. 10

AQUARIUM DIVIDER

CROSS-REFERENCE TO RELATED APPLICATIONS

This application claims priority to U.S. Provisional Patent Application No. 61/948,422 filed Mar. 5, 2014 entitled "Aquarium Divider", the contents of which are expressly incorporated herein by reference.

FIELD OF THE INVENTION

The present invention relates to aquarium dividing devices and more particularly pertains to a new adjustable aquarium divider for dividing an aquarium into separate sections while allowing water flow between the sections.

BACKGROUND OF THE INVENTION

Dividers for physically separating aquaria into compartments are generally known in the art. For example, U.S. Pat. No. 6,474,265 discloses a two-panel adjustable aquarium divider that utilizes a fastening member that fastens a first panel to a second panel such that the panels partially overlap and are positioned such that one lateral side edge of each panel abuts opposing walls of the aquarium.

U.S. Pat. No. 4,120,265 discloses a transparent aquarium divider that diagonally divides the aquarium into two physically separate compartments, rests on the bottom of the aquarium, and is of a height slightly greater than the level of water in the aquarium. The divider includes perforations adjacent its two ends for passage of water between the two compartments.

Disadvantages of conventional aquarium dividers are the inability to physically separate compartments across the width of the aquarium for better space utilization and enhanced aesthetics, a lack of rigidity and effective engagement of the aquarium wall, and difficulty in repositioning and replacement.

SUMMARY OF THE INVENTION

According to one preferred embodiment, the apparatus for dividing an aquarium into a plurality of compartments preferably comprises first and second retainer assemblies and a divider. In one aspect the retainer assembly includes a retainer member and a base member, and the base member is removably attachable to said aquarium. In another aspect, the retainer assembly further comprises a supporting member. The divider is positionable between the first and second retainer assemblies and comprises at least one opening allowing fluid communication between the compartments.

According to one preferred embodiment, the divider comprises edging along at least a portion of one of its edges that is flexible and/or resilient for abutting part of the aquarium wall. Alternatively, the edging includes a resilient member.

According to another preferred embodiment, the retainer member receives an edge of the divider in slidable engagement, and the retainer member may comprise a channel that frictional engages the divider.

According to a preferred embodiment of the invention, the base assembly is one component of a two-component fastener, and the second component may be located in the interior or exterior of the aquarium depending on the functional limitations of the fastener.

A method for dividing an aquarium into compartments is also described. The method comprises the steps of affixing first and second retainer assemblies to first and second locations in said aquarium, positioning a divider between said first and second retainer assemblies, and connecting said divider to said first and second retainer assemblies. According to one aspect, the divider may be trimmed to fit according to predetermined dimensions.

BRIEF DESCRIPTION OF THE DRAWINGS

For a more complete understanding of the present invention and for further advantages thereof, reference will now be made to the following Detailed Description taken in conjunction with the accompanying Drawings in which:

FIG. 3 is a perspective view of a divider according to one embodiment;

FIG. 4 is a perspective view of a divider showing edging according to another embodiment;

FIG. 5 is a perspective view of the retainer assembly shown in FIG. 1;

FIG. 8 is a cross-sectional view of a multiple component base member as described herein;

FIG. 9 is a partial perspective view of the divider and retainer member of the embodiment shown in FIG. 2, showing additional detail;

FIG. 10 is a cross-sectional view along line 10-10 of the embodiment of FIG. 9; and FIG. 11 is a perspective view of an embodiment of the fastener in FIGS. 2, 9 and 10.

DETAILED DESCRIPTION OF THE PREFERRED EMBODIMENTS

Figure 1:
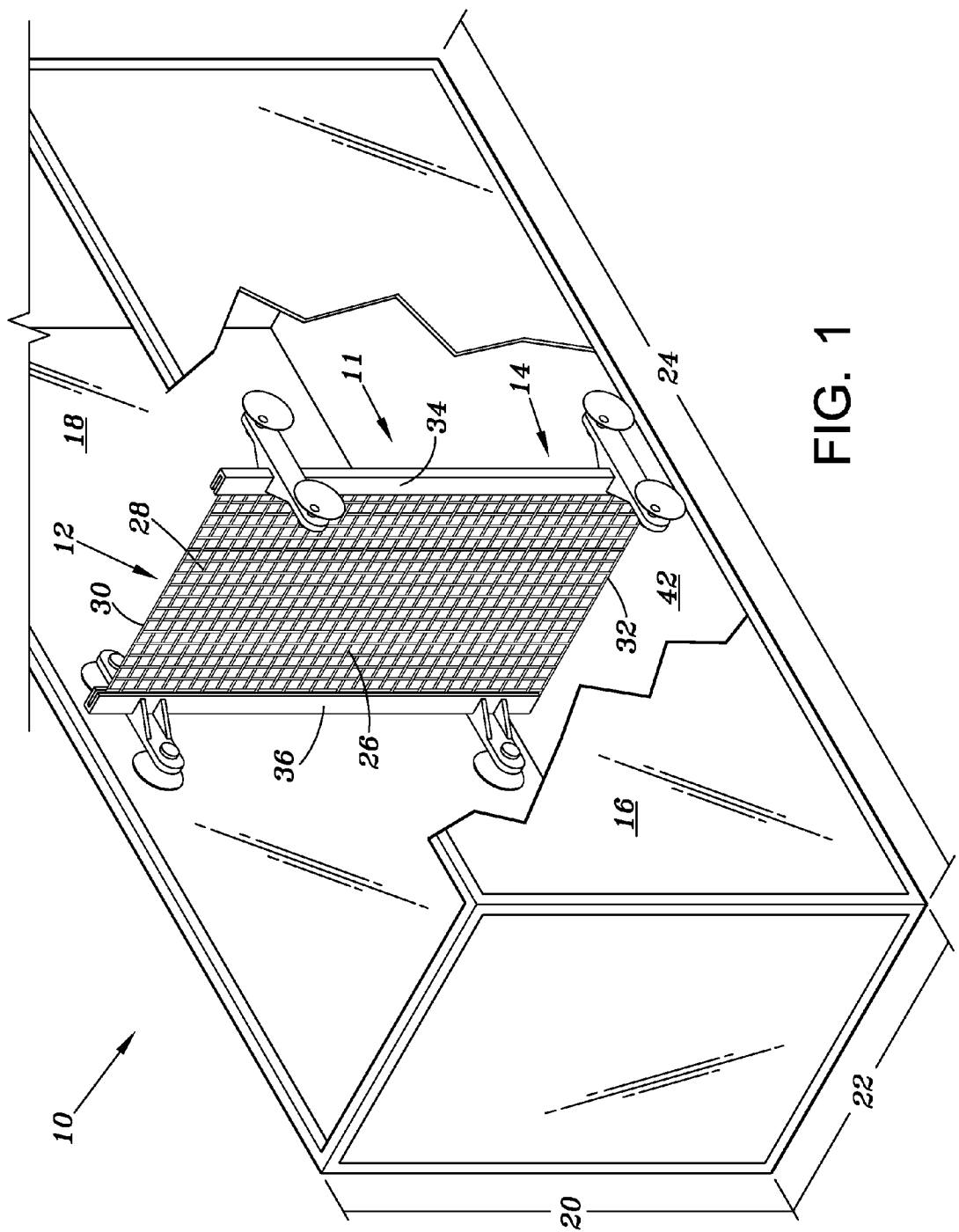
FIG. 1 is a perspective view of an embodiment of an aquarium divider and retainer assembly according to an embodiment described herein.

The words or terms used herein have their plain, ordinary meaning in the field of this disclosure, except to the extent explicitly and clearly defined in this disclosure or unless the specific context otherwise requires a different meaning.

If there is any conflict in the usages of a word or term in this disclosure and one or more patent(s) or other documents that may be incorporated by reference, the definitions that are consistent with this specification should be adopted.

The words "comprising," "containing," "including," "having," and all grammatical variations thereof are intended to have an open, non-limiting meaning. For example, a composition comprising a component does not exclude it from having additional components, an apparatus comprising a part does not exclude it from having additional parts, and a method having a step does not exclude it having additional steps. When such terms are used, the compositions, apparatuses, and methods that "consist essentially of" or "consist of" the specified components, parts, and steps are specifically included and disclosed. As used herein, the words "consisting essentially of," and all grammatical variations thereof are intended to limit the scope of a claim to the specified materials or steps and those that do not materially affect the basic and novel characteristic(s) of the claimed invention.

The indefinite articles "a" or "an" mean one or more than one of the component, part, or step that the article introduces.

Whenever a numerical range of degree or measurement with a lower limit and an upper limit is disclosed, any number and any range falling within the range is also intended to be specifically disclosed. For example, every range of values (in the form "from a to b," or "from about a to about b," or "from about a to b," "from approximately a to b," and any similar expressions, where "a" and "b" represent numerical values of degree or measurement) is to be understood to set forth every number and range encompassed within the broader range of values.

Terms such as "first," "second," "third," etc. may be assigned arbitrarily and are merely intended to differentiate between two or more components, parts, or steps that are otherwise similar or corresponding in nature, structure, function, or action. For example, the words "first" and "second" serve no other purpose and are not part of the name or description of the following name or descriptive terms. The mere use of the term "first" does not require that there be any "second" similar or corresponding component, part, or step. Similarly, the mere use of the word "second" does not require that there be any "first" or "third" similar or corresponding component, part, or step. Further, it is to be understood that the mere use of the term "first" does not require that the element or step be the very first in any sequence, but merely that it is at least one of the elements or steps. Similarly, the mere use of the terms "first" and "second" does not necessarily require any sequence. Accordingly, the mere use of such terms does not exclude intervening elements or steps between the "first" and "second" elements or steps, etc.

While the making and using of various embodiments of the present invention are discussed in detail below, a practitioner of the art will appreciate that the present invention provides applicable inventive concepts, which can be embodied in a variety of specific contexts. The specific embodiments discussed herein are illustrative of specific ways to make and use the invention and do not delimit the scope of the present invention.

Figure 2:
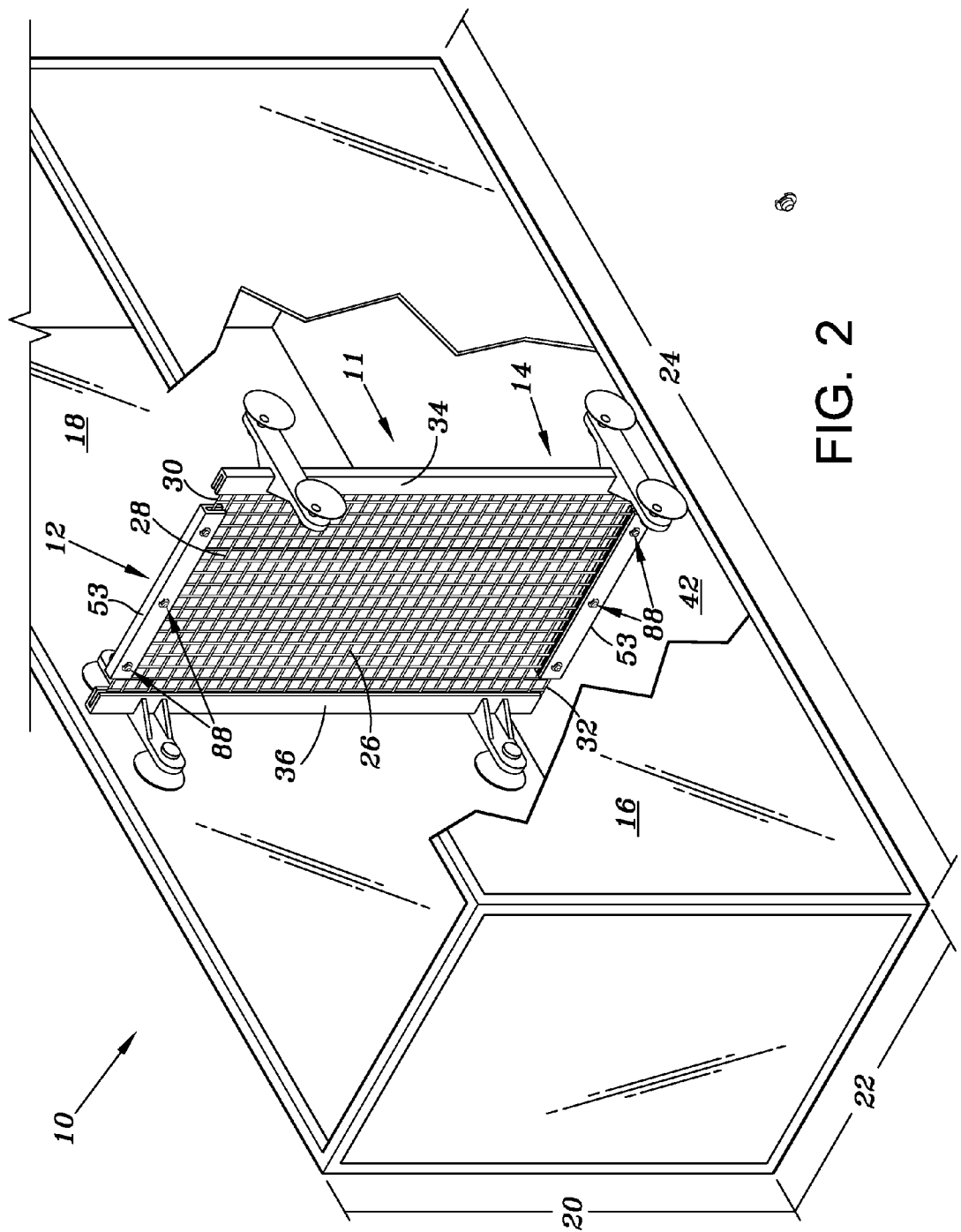
FIG. 2 is a perspective view of an embodiment of an aquarium divider and retainer assembly according to another embodiment described herein.

FIG. 1 shows an aquarium 10 having installed therein an aquarium divider assembly 11 comprising a divider 12 held in place by a retainer assembly 14 for separating the aquarium into at least two 16, 18 compartments. The aquarium has a height 20, width 22 and length 24. As shown in FIGS. 1 and 2, the divider 12 includes a first side 26, a second side 28, a top edge 30, a bottom edge 32, and first and second side edges 34, 36. The distance between the top and bottom edges 30, 32 defines a length 38, and the distance between the first and second edges defines a width 40. The top edge 30 is substantially near or aligned with the surface of the water in the aquarium or may be substantially near or aligned with the top of the aquarium, and the bottom is adjacent to and may at least partially engage the bottom 42 of the aquarium 10. In some embodiments the bottom may align with or be buried in material on the bottom of the aquarium, such as but not limited to rocks, gravel, sand and the like.

Referring FIGS. 1-4, the divider further has spaced apart first and second sides 26, 28 that define a thickness 44 through which at least one and optionally a plurality of openings 46 extend therethrough that permits fluid communication between first and second compartments formed by the divider. The at least one opening 46 is sized to prevent or significantly restrict undesirable materials or organisms such as fishes and other water-borne animals to the compartment in which they have been contained as formed by at least one divider. In some embodiments, the divider is a porous mesh material or screen and has a grid of openings. In some embodiments have a mesh size of less than 3, where 3 is the number of openings per linear inch. In some embodiments the openings are less than 4 or less than 5 or less than 6 or less than 7 or less than 8 or less than 9 or less than 10 or less than 12 or less than 15 or less than 20 or at least 200 or at least 100 or at least 50 or at least 20 or at least 10 or combinations thereof. In some embodiments, the divider may be made of plastic, non-toxic plastic, plastic canvas, foam, plastic sheet, plexi glass, glass, or netting, and the like.

Referring further to the embodiment illustrated in FIG. 2, in addition to the divider 12 and the retainer assembly 14, divider assembly 11 may further comprise one or more retaining support members 53. Retaining support members 53 may be included to provide additional rigidity or support for the divider 12. Divider 12 may be fastened to the support members with any suitable fastener means, although one means is using pin assembly 88, which is shown in further detail in FIGS. 9-11.

FIGS. 9-11 illustrate a preferred embodiment of fastening the divider 12 in the channel 62 by pin assembly 88. In particular, pin assembly 88 comprises pin 90 having an enlarged head 92 that steps down to shaft 94 that includes a circumferential recess 96 near the shaft distal end 98, the circumferential recess being sized to receive a releasably engageable snap-fit ring 100. In this embodiment, the retainer member 54 and divider 12 preferably includes aligned openings sized to receive shaft 94 with the shaft extending through the retainer member and divider and the ring being received in the recess to at least partially hold the divider in channel 62 (in some embodiments the divider 12 is snug in channel 62 and the pin assembly 88 further assists in holding the divider 12 in position).

As shown in FIGS. 3 and 4, in some aspects the divider may include a covering 48, such as a flap or "windsock"-like conical tubing over the openings that permit fluid communication between compartments but prevents or reduces the movement of materials and organism to another compartment. The flaps or conical tubing could be included on either side of the divider but are preferably on the side of the materials or organisms suggesting movement across the divider.

The dimensions of the divider approximately correspond to one or more of the dimensions of the aquarium. For instance, the divider is substantially the same height, width, or length, or a combination thereof, as the aquarium. The divider is also positionable vertically or horizontally between opposing or adjacent walls of the aquarium, including first and second locations on the same wall of the aquarium (for instance, such as when the divider is made of a flexible material). It is also understood that multiple dividers may be inserted into the aquarium to form more than two compartments depending on a user's particular needs.

Where the divider 12 comprises a plurality of openings 46, the openings may be arranged in a grid-like pattern as shown in FIGS. 1 and 2, or may alternatively be arranged in another functionally suitable manner.

The divider is preferably injection molded, and may be made of any suitable, durable thermoplastic polymeric material. Acrylic plastics or polycarbonate and other corrosion-resistant materials, such as aluminum, stainless steel, foam, plastic sheeting, glass, netting and the like may be used. Materials that may be trimmed-to-fit by the end user would be particularly preferable, and therefore materials that can be cut with home power tools, or with hand tools requiring a grip strength of less than about 125 pounds [see Table 2 of Mathiowetz et al., *Arch Phys Med Rehabil* 66 (2): 69-74, (1985)], are preferred. In some embodiments the divider is a porous mesh material, which readily allows for water flow-through but not fish or other animals.

As shown in FIG. 4, at least one divider edge 50 may include or have attached thereto a resilient member 52. For example, resilient member 52 may be attached to the bottom and first and second edges for substantially abutting the bottom and sides of the aquarium to restrict movement of undesirable materials and/or organisms from the compartment in which they are contained. Where resilient member 52 and supporting member 56 are attached to the same edge, a portion of the resilient member may be where there supporting member 56 is attached to the edge. The resilient member is typically made of a pliable, elastomeric, polymeric material.

FIG. 5 shows the retainer assembly 14 comprising a retainer member 54, supporting members 56, and base members 58. The retainer member 54 is held in place in the aquarium 10 by the supporting members 56 that connect to the base members 58, which engage the respective aquarium wall.

The retainer member 54 extends longitudinally along axis 60 and is constructed for receiving edges of the divider in slidable engagement. In the embodiment shown in FIG. 1 the retainer members 54 extend and are coterminous with the length of the first and second side edges 34, 36 of the divider, although the retainer member 54 may extend a substantial portion but preferably no less than about 60% of the length of the edges of the divider 12.

Figure 6A:
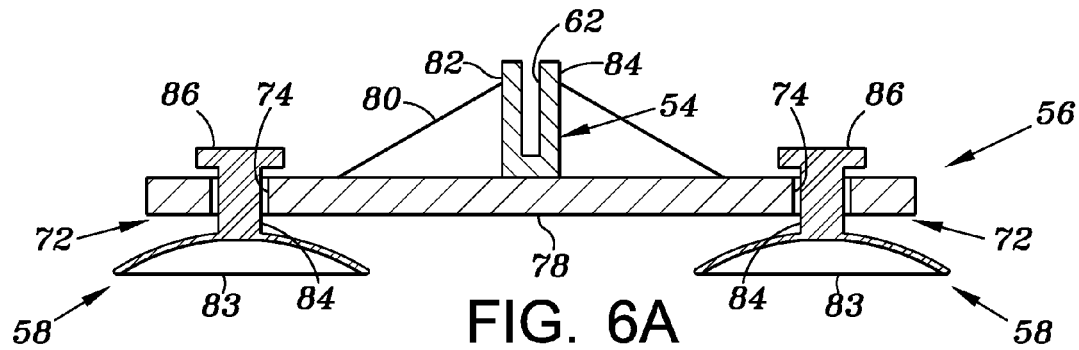
FIG. 6A is a cross-sectional view of the retainer assembly along line 6A-6A of FIG. 5.
Figure 6B:
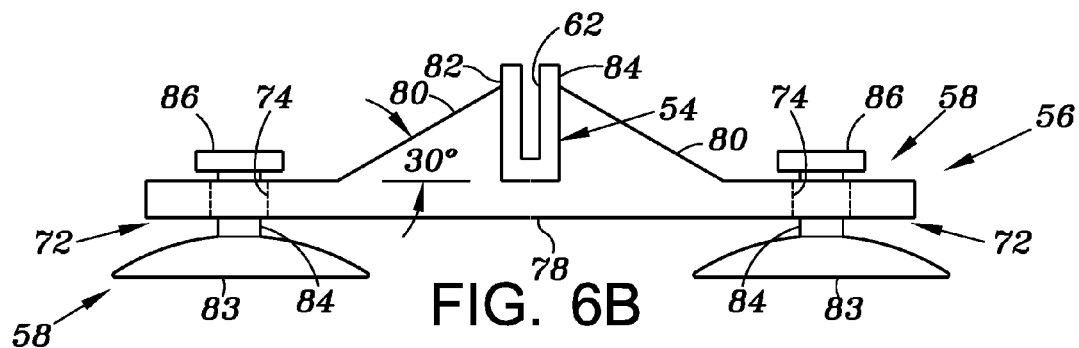
FIG. 6B is a side elevation view of the retainer assembly of FIG. 5 showing the reinforcing members.
Figure 6C:
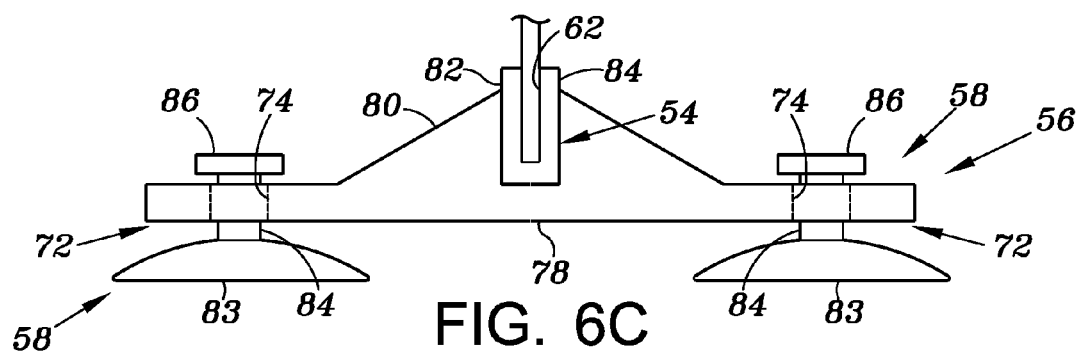
FIG. 6C is a side elevation view of the retainer assembly of FIG. 6B in relationship to aquarium dividers described herein.
Figure 7:
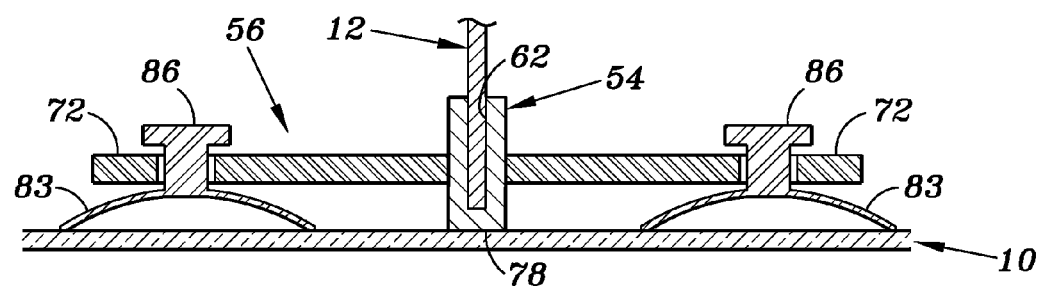
FIG. 7 is a cross-sectional view of an exemplary retainer assembly in use and showing a divider.

The retainer member 54 includes a channel 62 for receiving edges of the divider 12, and in the embodiment depicted in FIGS. 5-7 is a U-shaped channel, although other shapes that effectively retain the divider are acceptable. In some embodiments, the width 64 of the channel 62 is slightly less than the thickness 44 of the divider 12 to facilitate tight frictional engagement between the channel 62 and a divider edge 30, 32, 34, and/or 36, or combinations thereof. The channel 62 also has a length or depth 68 that is sufficiently long or deep to retain the divider. The retainer material is preferably, but not necessarily, injection molded and may be made of any suitable, durable thermoplastic polymeric material. Acrylic plastics or polycarbonate are particularly preferred for use in the invention. In some embodiments, the divider 12 is held in the channel 62 by one or more fasteners, such as a pin, stopper (for instance rubber or plastic), clip, tube, or latch 90 that may be fitted through an opening in the sides of the retainer member 54 and/or supporting member 56.

The supporting member 56 holds the retainer member 54 in place via base member 58. As illustrated in FIGS. 5-7, the long axis 70 of the supporting member 56 is approximately perpendicular to the long axis 60 of the retainer member and includes laterally extending flanges 72. In some embodiments, laterally extending flange 72 comprises an opening 74 that is preferably but not necessarily near their lateral end 76 (relative to the retainer member 54). The supporting member 56 is attached to or abuts the surface below the channel. As shown in FIG. 7, the bottom surface 78 of the supporting member 56 alternatively lies in substantially the same plane as the contact surface of the retainer member 54 to permit at least one divider edge to abut the aquarium wall as described in some embodiments. The supporting member and retainer member may be a single piece, or the supporting member may be affixed to the retaining member by fastener, weld, snap-fit or by other suitable means.

As shown in FIGS. 6B and 6C, the supporting member 56 may further include reinforcing member(s) 80 that attach to or abut the exterior surfaces 82, 84 of the retainer member 54. In a preferred embodiment the reinforcing member 80 tapers from at or near the retaining member channel 62 at approximately a 30° angle (with respect to the supporting member long axis) to the laterally-extending flange 72. In embodiments where flange 72 comprises an opening 74, the reinforcing member 80 preferably does not extend laterally past opening 74. In one aspect, the reinforcing member 80 may be spaced-apart ridges, for example, that extend along each edge of laterally-extending flange 72.

The base member 58 removably attaches to the walls of the aquarium and is held to the retainer member 54 by the supporting member 56. In the embodiment shown in FIGS. 5-7, the base member 58 comprises a suction cup 83 that includes a stud 84 and head 86. The stud 84 extends through an opening 74 of the supporting member 56 and is longer than the thickness of the laterally-extending flange 72, and is held in place by a head 86 which has a diameter or long axis longer than the diameter or long axis of opening 74 in supporting member 56.

FIG. 8 depicts an exemplary alternative embodiment wherein the base member 58 may comprise one part of a two-part fastener, such as a magnet or hook-and-loop fastener (i.e., VELCRO®), where the second part may be attached or disposed adjacent to (or even spaced apart from) the aquarium in a location desirable for positioning the divider. For example, where the base member 58 is a magnet of a first polarity, a magnet of the opposite polarity is affixed to a complementary position on or near the interior or the exterior of the aquarium. A magnet of opposite polarity is positioned (removably or fixedly) exterior of the aquarium. Although FIG. 8 depicts two magnets affixed to the base member flanges 72 and two magnets affixed to the exterior surface of the aquarium, one magnet may be sufficient in which case one magnet of opposite polarity may also be sufficient. Moreover, instead of being affixed to the support member 56, one or first component of the base member 58 may be integral to or comprised within the support member 56 such as to be adjacent to the aquarium wall.

The base member 58 and the supporting member 56 may be a single piece. Alternatively, the base member is affixed to the supporting member by fastener, weld, snap-fit or by other suitable means, that therefore permits quick parts replacement or substitution with different base members.

In practice, the aquarium divider assembly 11 described herein is installed with minimum effort. In one manner of using the divider, the dimensions of the aquarium is measured prior to installation, and the divider 12 pre-formed or pre-cut to those approximate dimensions is obtained. Alternatively, a divider with slightly larger dimensions is trimmed to fit (as noted above) to desired dimensions by the user, for example, to approximately match the dimensions (height, width and/or length) of the aquarium. Other dimensions may be desired. A separate resilient member 52, if not integrally formed as resilient edging 50 with divider 12, may be attached to one or more edges of the divider, as desired.

Retainer assemblies are affixed to desired locations within the aquarium, such as shown in FIG. 1, or even along the same wall where a flexible divider (e.g., netting) is used. In this embodiment, the bottom of the divider may be in contact with the bottom of the aquarium or buried in material, such as but not limited to sand, rocks, or gravel, and the like.

In a method of using the divider assembly 11, divider 12 is positioned between and connected to first and second retainer assemblies in the aquarium. Alternatively, the divider 12 is positioned between first and second retainer assemblies and connected before the divider assembly 11 is inserted into and affixed within the aquarium. The methods may be repeated with a second pair (third and fourth) retainer assemblies with another divider 12. If desired, a resilient member 52 may also be affixed to at least one edge of divider 12 before insertion of the divider assembly 11 or divider 12 according to the described embodiments.

The embodiments shown and described above are exemplary. It is not claimed that all of the details, parts, elements, or steps described and shown were invented herein. Even though many characteristics and advantages of the present inventions have been described in the drawings and accompanying text, the description is illustrative only. Changes may be made in the detail, especially in matters of arrangement of the parts or steps within the scope and principles of the inventions. The restrictive description and drawings of the specific examples above do not point out what an infringement of this patent would be, but are to provide at least one explanation of how to use and make the inventions. The limits of the inventions and the bounds of the patent protection are measured by and defined in the following claims.

I claim:

1. An apparatus for dividing an aquarium into a plurality of compartments, the apparatus comprising:
   first and second retainer assemblies, each retainer assembly comprising:
      a retainer member having a long axis and two sides;
      first and second supporting members, each supporting member being attached to and extending from the two sides of the retainer member, and having a long axis extending perpendicular to the long axis of the retainer member; and
      a plurality of base members, first and second base members of said plurality of base members being attached to each supporting member, wherein said base members are capable of removably attaching to said aquarium, and wherein the retainer member is held in place by said first and second supporting members via said base members; and
   a mesh divider positioned between said first and second retainer assemblies and in said retainer members, wherein said first and second retainer assemblies are positioned on first and second opposing sides of said mesh divider.

2. The apparatus of claim 1, wherein each of said retainer members comprises a channel that frictionally engages the divider.

3. The apparatus of claim 2, wherein the channel is U-shaped.

4. The apparatus of claim 1, wherein said divider is configured to be substantially the same height, and either length or width, of said aquarium.

5. The apparatus according to claim 1, further comprising third and fourth retainer members attached to third and fourth opposing sides of said divider by pin assemblies.

6. The apparatus according to claim 1, wherein each of said base members further comprise suction cups capable of attaching to said aquarium.

7. The apparatus according to claim 6, wherein each of said base members comprises a stud and a head, the stud extending through an opening in one of the supporting members and held in place by said head.

8. The apparatus according to claim 1, wherein the mesh of said porous mesh divider has a size less than 3 openings per linear inch.

\* \* \* \* \*